Oct. 15, 1946.　　　A. F. SOLON　　　2,409,399
TRAILER HITCH DEVICE
Filed March 12, 1945
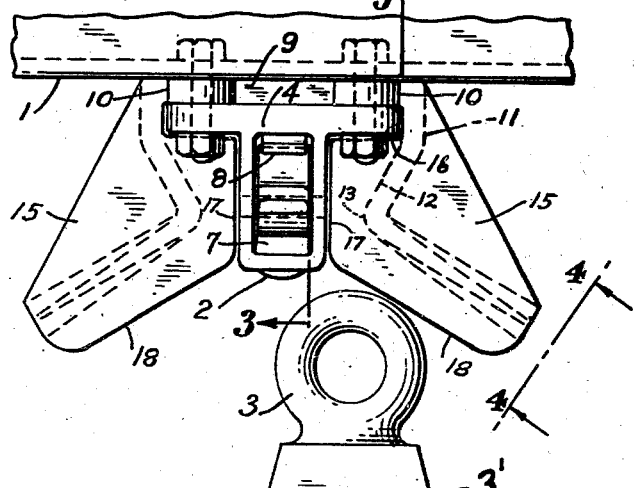
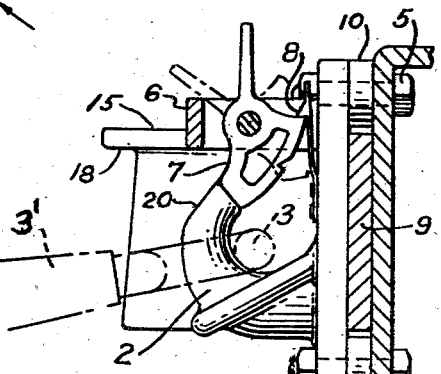
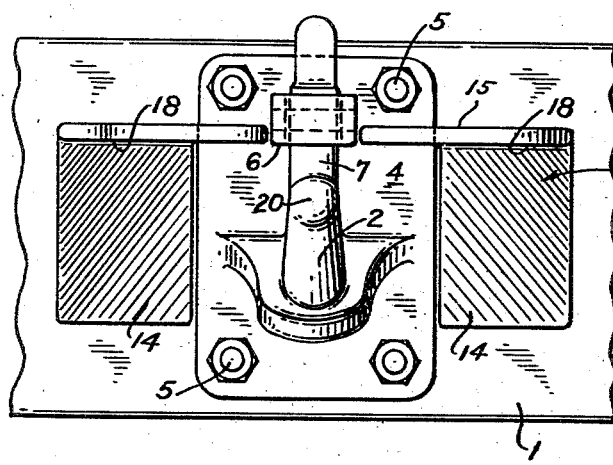
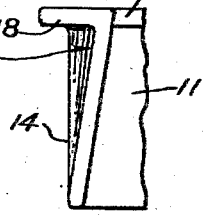
INVENTOR.
ALFRED F. SOLON
BY
ATTORNEY.

Patented Oct. 15, 1946

2,409,399

UNITED STATES PATENT OFFICE 2,409,399

TRAILER HITCH DEVICE

Alfred F. Solon, Oakland, Calif.

Application March 12, 1945, Serial No. 582,387

4 Claims. (Cl. 280—33.15)

This invention relates to trailer hitches of the type where the pulling vehicle carries a hook at the rear end of its frame and the trailer has a draft bar with an "eye" at the end adapted to be placed over the hook of the pulling vehicle.

The object of the invention is to provide improvements in means guiding the eye to the hook when the pulling vehicle is backed up toward the trailer to connect the two vehicles.

Particular features of the invention will appear in the following description and accompanying drawing.

In the drawing,

Fig. 1 is a plan view of a trailer hitch secured to the rear end of the frame of a pulling vehicle and embodying my improvements.

Fig. 2 is a rear elevation of the device of Fig. 1.

Fig. 3 is a side view of Fig. 1 in cross section as taken along the line 3—3 of Fig. 1.

Fig. 4 is an end elevation of one of the eye-guiding plates viewed in direction of the arrows 4—4 of Fig. 1.

In further detail the drawing shows at 1 the rear portion of a motor truck or "pulling car" to which is secured a hook 2 for engaging the "eye" 3 at the end of a draw-bar 3' of the trailer (not shown).

As one of the features of my invention is its adaptability for use with existing trailer hooks already installed on pulling cars and trucks to guide the eye of the trailer draw-bar to the hook, the drawing shows such a combined installation.

The hook 2 is generally of steel and is secured to or cast integral with a steel plate 4 which heretofore has been directly secured to the rear wall of the vehicle frame 1 as by bolts 5 and with the hook projecting rearwardly from it. The plate 4 also has projecting rearwardly from it a slotted bracket 6 in which is pivotally mounted a latch bar 7 which swings to contact with the end of the hook as shown in full line in Fig. 3 to close the gap above the hook when the eye is over the hook and is locked in place as by a spring 8 which may be manually released to swing the latch bar open to dotted position shown in Fig. 3, and where it is also held by the pressure of the spring.

This hook on its attaching plate 4 and latch is old and well-known construction, as stated generally bolted directly to the leading vehicle frame, whereas in the drawing I show a separate steel casting or device embracing plate 4 and formed with a flat wall 9 passing between the plate 4 and the vehicle frame 1 and with plate 4 extending beyond wall 9 or "straddling" it and preferably bolted to the vehicle frame both above as well as below it by the bolts 5 which may have suitable spacers 10 around them under plate 4 to compensate for the thickness of wall 9, though the spacers may be omitted if the bolts come near the edges of wall 9, or if wall 9 is as large or larger than plate 4 and which of course it may be if desired.

Vertical wall 9 is extended forward past the two vertical edges of plate 4 as indicated at 11, then slanted inwardly over these edges as at 12 to the innermost point 13, thence slantingly outward as at 14 to form a pair of substantially vertical outwardly flaring guide plates adapted to guide the eye of the trailer toward the relatively narrow space between and over the hook there located.

Extending across the upper edges of walls 11—14 are flat plates 15 which are formed to come in front of hook plate 4 as at 16 to form a slot for its reception and brace it from in front, and the plates 15 project inwardly over wall 12, in confronting relation as at 17 to form an open slot to receive bracket 6, and forwardly of walls 14 as at 18 to provide overhanging ledges to prevent the eye from going over the upper edges of the flaring guide walls 14 when the pulling car is backed up to force the trailer eye over the hook.

At their outer ends flaring walls 14 are preferably not vertical, but are slanted forwardly (toward the pulling car) slightly as shown in Fig. 4 as indicated by the arrow 19 leading also to the corresponding portion of the wall on Fig. 2. This formation urges the eye of the trailer to move both upwardly to contact flange 18 as well as inwardly toward the hook so that it will be in position to fall over it when it reaches the central position. The hook is also preferably beveled off on its rear edge as at 20 to facilitate the operation.

From the above description it will be evident that while my improved features are particularly applicable to existing trailer hook installations, yet for new installations I may make plates 4 and 9 integral—that is in effect omit 9 so as to have a unitary structure embodying some of the advantages above described.

Also to be noted is that while I have shown my improvements applied to an ordinary trailer hook it is equally applicable to trailer hooks having additional features to those shown.

I therefore claim:

1. In a trailer hitch of the character described having an attaching plate with a hook projecting from one side, means for guiding the eye of a trailer drawbar to said hook comprising a rigid body secured to said plate and provided with a pair of upright walls spaced on opposite sides of said hook while preserving an open slot above the hook and diverging outwardly therefrom, and horizontally extending flanges at the upper edges of said walls overhanging the same to limit upward movement of the drawbar eye when the diverging walls are moved toward the eye so as to guide the eye to position for falling over the hook, said upright walls being arranged in a manner to urge the eye upward against the overhanging flange when the walls are forced against the eye.

2. In a structure as set out in claim 1, said flanges also overhanging both sides of both walls to form angular bracing for the walls.

3. In a structure as set out in claim 1, said flanges also overhanging both sides of said walls to form rigid angular bracing for the walls and a transversely extending upright wall joining the inner ends of said upright walls extending across the opposite side of said attaching plate and whereby said attaching plate is embraced from opposite sides by said flanges and the transversely extending wall.

4. In a structure as set out in claim 1, a latch bracket extending from said attaching plate above said hook positioned in said slot provided between said flanges.

ALFRED F. SOLON.